Figure 1:
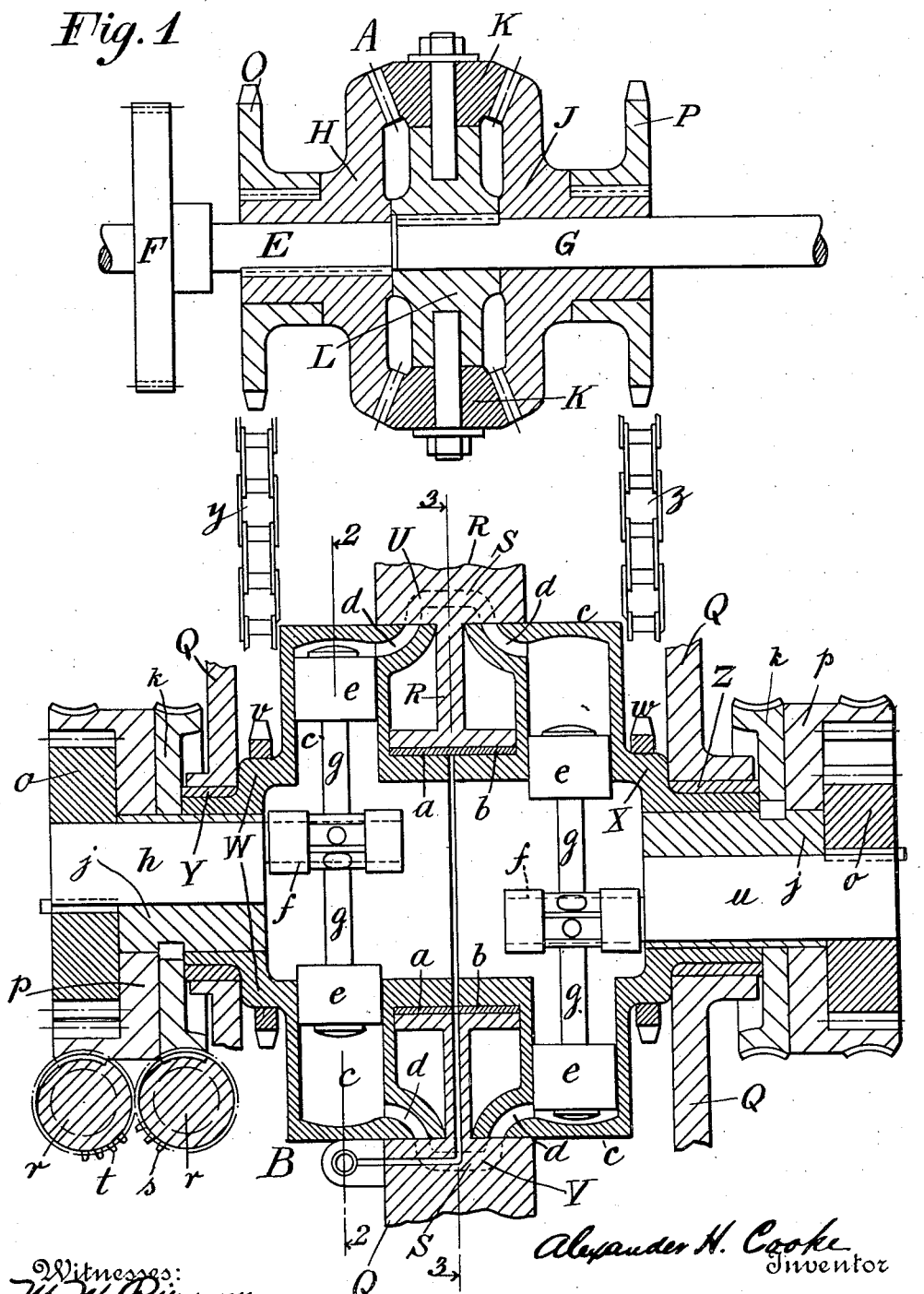

A. H. COOKE.
VARIABLE SPEED TRANSMISSION GEARING.
APPLICATION FILED MAY 11, 1912.

1,077,454.

Patented Nov. 4, 1913.

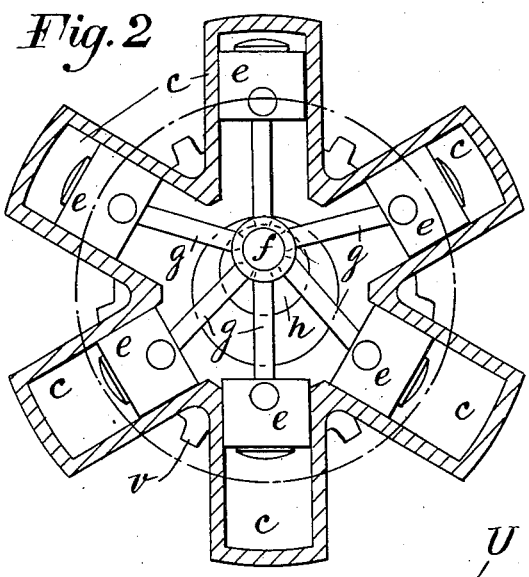
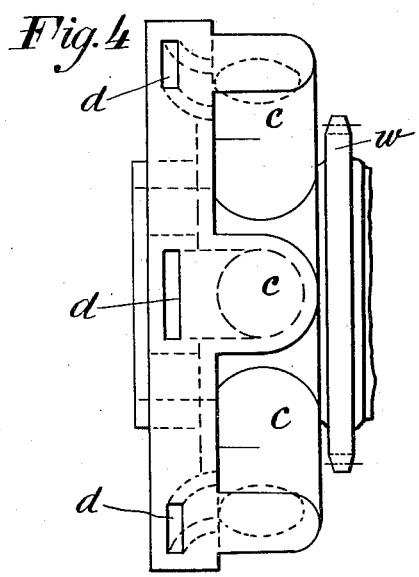
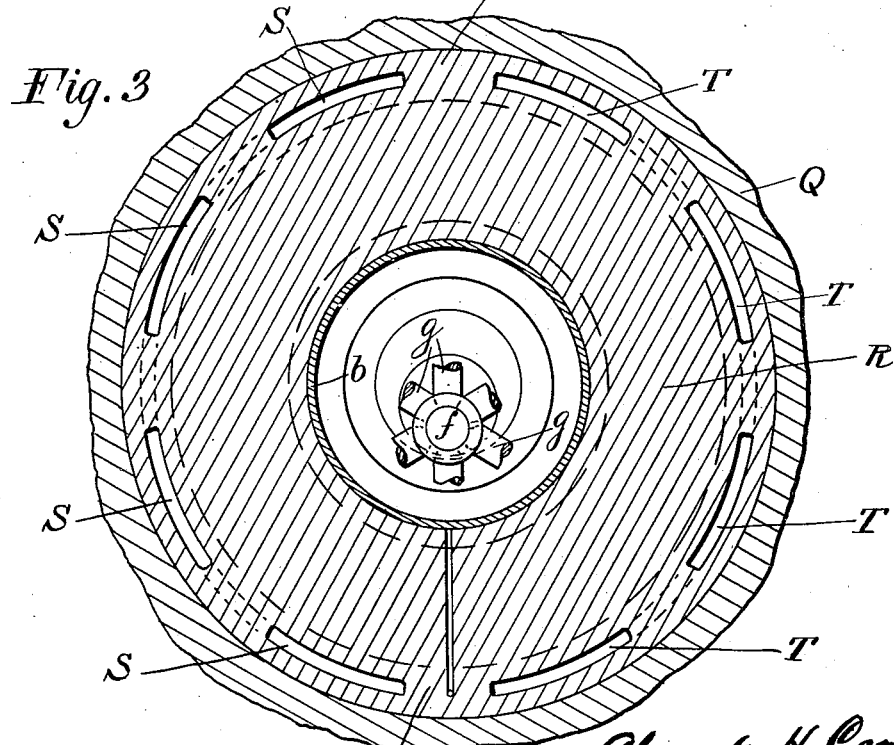

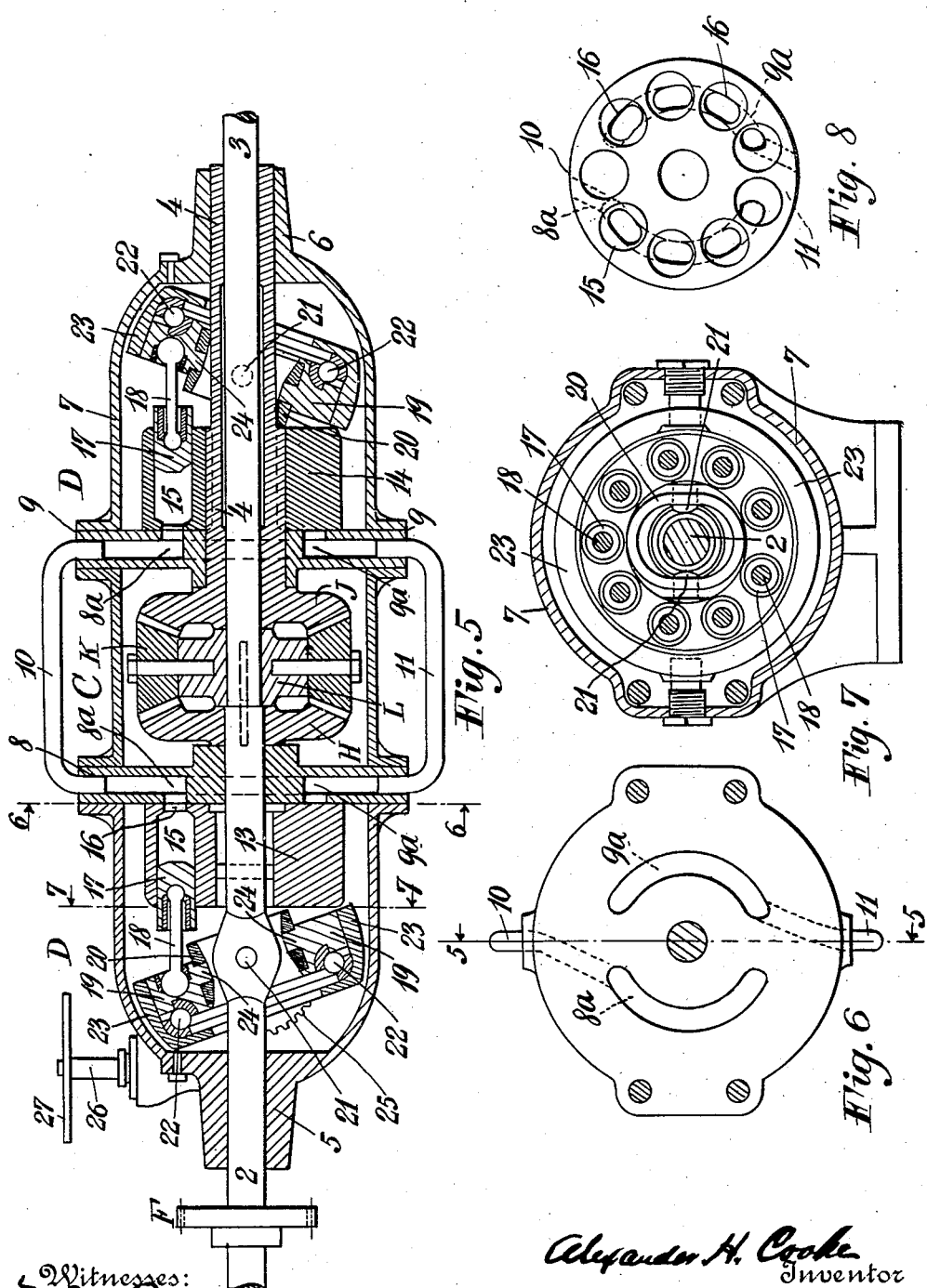

UNITED STATES PATENT OFFICE.

ALEXANDER H. COOKE, OF NEW YORK, N. Y.

VARIABLE-SPEED-TRANSMISSION GEARING.

1,077,454.

Specification of Letters Patent. Patented Nov. 4, 1913.

Application filed May 11, 1912. Serial No. 696,628.

*To all whom it may concern:*

Be it known that I, ALEXANDER H. COOKE, a citizen of the United States, and a resident of the borough of Manhattan, city, county, and State of New York, have invented certain new and useful Improvements in Variable-Speed-Transmission Gearing, of which the following is a specification, accompanied by drawings.

This invention relates to variable speed transmission gearing of the type in which driving and driven shafts are connected by main transmission elements, as for instance differential gearing in which the rotation of one movable member is controlled to vary the speed and direction of rotation of the driven shaft. Various means have been utilized for controlling said movable member of the main transmission elements, as a braking device, frictional gearing and the like, but have not been postively acting and have entailed an inevitable loss of power and devices have been wasteful of power and have consequently reduced the transmission efficiency of the gearing, even in those cases in which the power for operating the controlling devices has been derived from the shaft or its connections, and restored to the driven shaft.

[?] of the present inven[tion]
[?] or other ele[ment]
[?] direction [?]

direction of the arrows; Fig. 3 is a transverse sectional view taken on the line 3—3 of Fig. 1 looking in the direction of the arrows; Fig. 4 is a detail plan view of the motor cylinders; Fig. 5 is a longitudinal sectional elevation of a modified form of apparatus on line 5—5 of Fig. 6; Fig. 6 is a face view of one mid plate on line 6—6 of Fig. 5; Fig. 7 is a transverse sectional view of Fig. 5 on the line 7—7; and Fig. 8 is a detail view showing the face of the cylinder barrel.

Referring to the drawings, A represents the main variable speed transmission gearing shown in this instance preferably in the form of continuously positive differential gearing, and B represents a suitable form of fluid pressure variable speed transmission gearing which is also continuously positive forming the controlling means for the main gearing. While the constructions shown the forms I prefer to use, other suitable structions may be used and in Fig. 5 I illustrated a modified construction in C is the main differential gearing represents the fluid pressure control vices in the form of a transmission Illustrations of means for carryin principles of the invention might plied, but these figures will serve the construction of the apparat In Fig. 1, E represents the shaft to which power may be a suitable means, as the pulley G is the driven element sho the speed and directi varied. The di[fferential]

ports S and T in the valve structure R during rotation of the pump structure on its trunnions. The pistons $e$ are suitably connected to a radially adjustable crank pin $f$ by connecting rods $g$ adapted to turn on $f$ and around the crank pin. Said crank pin is carried eccentrically by a shaft $h$ as shown is carried eccentrically by a shaft $h$ extending through the trunnion of the pump structure W. A worm gear $k$ is fast to the bushing $j$ and a spur gear $k$ is fast to the shaft $h$. A worm gear $p$ is loosely mounted on the bushing $j$ and provided with internal teeth meshing with the spur gear $o$. As shown, worm screws $r$ and $r$ mesh with the worm gears $k$ and $p$ respectively, and said screws are connected by gears $s$ and $t$ so that the bushing $j$ and shaft $h$ may be rotated in opposite directions to adjust the radial position of the crank pin $f$ to vary the throw of the pistons $e$ in the cylinders, all as set forth in United States Patent No. 710,485.

The motor cylinder structure at one side, is in all respects similar to the pump cylinder structure at the other side and the adjustment of the pistons is controlled in the same way. The motor is connected to operate the shaft $u$, and the pump and motor cylinder structures W and X are provided respectively with the sprockets $v$ and $w$ connected by the chains $y$ and $z$ with the sprockets O and P on the gears H and J of the main transmission device.

In the operation of the fluid pressure device, as well understood, the pump pistons alternately force and suck fluid through the valve ports and passages in the valve structure R, and supply and exhaust motive fluid to and from the motor cylinders, causing rotation of the motor cylinder structure. The radial adjustment of the pump and motor and direction of the sprocket $w$. With the position of the parts as shown in Fig. 1, the motor structure will rotate in the same direction as the pump structure, and the speed of the motor structure may be controlled from zero to maximum in either direction, and in infinitely small amounts.

In the operation of the entire transmission gearing, including the main gearing and the fluid pressure controlling device, power is applied to the gear or pulley F on the main driving shaft E, and said power is transmitted through the chain $y$ to drive the pump structure W in the same direction as the gear F. By adjusting both crank pins $f$ of the pump and motor to the centers of the shafts $h$ and $u$ respectively, no power will be transmitted to the gear J of the main gear train, but said gear will be held stationary and the driven shaft G will be driven at normal speed solely through the main gear train and in the same direction as the driving shaft H and in the same direction of rotation. The speed and direction will depend upon the relative speeds and directions of rotation of the gears H and J. The gear J forming the movable controlling member is connected to be governed by the fluid pressure controlling devices, although obviously the bridle L might be arranged loosely on the driven shaft and form the gear J would be connected fast to the driven shaft.

The fluid pressure variable speed transmission or controlling device I prefer, comprises a rotary reciprocating pumping device and a rotary reciprocating motor arranged between the driving and driven elements, and through which the pump and the motor. Suitable means are provided for adjusting the relative capacities of the pump and motor, whereby the pump may be operated at a substantially constant speed in one direction, and the driven element will be operated at different speeds in either direction, according to the adjustment of the device.

I have shown only so much of the fluid pressure transmission device as will serve to illustrate the principal illustration of said fluid pressure, since the structure is similar to a longitudinal sectional view shown in United States Patent No.

In Fig. 1, Q represents a portion of stationary frame, in which a valve structure R is fixed, having circular ports S and T, said ports being shown in this view as passages formed in the inner valve structure, said ports projecting from the inner faces being separated from each other, and ridges or partitions each other, and plane in Fig. 1.

Opposite to the valve structure, cylinder structures Y and Z carried by trunnions journaled respectively in the journaled respectively in the bearings of the $b$ carried by the is shown at the $t$, and since the pump only functions of appear. The rality of ratable ports $v$ with the the driving shaft E. By adjusting the crank pins $f$ so that the motor structure X will drive the gear J in the opposite direction to the gear H and at the same speed, no rotation will be imparted to the driven shaft G. The variations of speed of the driven shaft J are obtained by relative adjustments of the crank pins $f$ of the fluid pressure device. Thus, under those conditions in which the driven shaft G is brought to a state of rest, the influence exerted by the main gearing alone on the driven shaft to communicate motion thereto is exactly counteracted by an equal and opposite influence exerted by the fluid pressure variable speed transmission. By still further increasing the opposing influence of the fluid pressure transmission to such an extent that its influence is greater than the influence of the main gearing alone on the driven shaft G, a reversal of motion of the driven shaft G with reference to the direction of rotation under normal speed will result. Furthermore, the speed of the driven shaft between the limits of a speed in excess of the normal speed of the driven shaft down to an actual reversal of speed of the driven shaft may be enhanced or diminished by infinitely small amounts.

At some definite predetermined ratio between the speeds of the driving and driven shafts as described, the power or motion will be transmitted entirely through the main gearing, which may be as shown a train of gears or differential gearing, and no power will be transmitted through the fluid pressure controlling device, and the speed of the driven shaft at this predetermined ratio I have termed the "normal" speed of the driven shaft.

The work of the relatively less efficient fluid pressure device is minimized as compared with the work it would perform if operating alone as a variable speed gearing, and the work of the more efficient main gearing relative to the fluid pressure device is maximized, so that the function of the fluid pressure device is to increase or decrease the speed of the driven shaft above or below normal speed, at which normal speed no power will be transmitted by the fluid pressure device, and all the power will be transmitted by the main gearing.

In minimizing the work performed by the fluid pressure device, I am able to reduce its dimensions for a given amount of power to be delivered to the driven shaft, reduce the wear and tear of moving parts, reduce frictional losses, reduce losses due to heating of the fluid used in the fluid pressure device, and maintain a higher degree of efficiency for a longer period after deterioration of the fluid pressure device has set in.

Since the efficiency of power transmission by gearing is greater than by fluid pressure, the efficiency of my improved apparatus will equal the higher efficiency of the main gearing at the normal speed of the driven shaft; and within reasonable limits above and below the normal speed of the driven shaft the efficiency of my apparatus will partake more largely of the relatively high efficiency of the main gear train, than of the relatively low efficiency of the fluid pressure controlling devices. For instance, if the assumed efficiency of the main gear train alone is 95% and that of the fluid pressure device alone is 60%, then at infinitely small speeds of the driven shaft in either direction and also at a speed of 100% in excess of the normal speed of the driven shaft, the efficiency of my apparatus partakes equally of the efficiencies of the main gearing and fluid pressure device, which under these circumstances would transmit equal amounts of power, and the efficiency of the apparatus would be equal to the average efficiency for the two or 77½%. At the normal speed of the driven shaft, however, the efficiency of the apparatus would be 95% or equal to that of the main gearing. At intermediate points between these limits the efficiency of my apparatus will range from 77½% to 95%, as contrasted with the assumed efficiency of 60% of the fluid pressure device when operating alone and without the main gearing, and at such intermediate points the efficiency of my apparatus will partake of the individual efficiencies of the main gearing and the fluid pressure device in direct proportion to the power transmitted by each. For instance, when the driven shaft is operated at a speed of 50% of the normal speed or at 50% in excess of the normal speed, then 66⅔% of the power is transmitted by the main gear train and 33⅓% is transmitted by the fluid pressure devices. These figures are based on the assumption that the speed ratio between the sprockets O and $v$, is the same as the speed ratio between the sprockets P and $w$, in which case the division of power as well as the efficiency of my improved device under different conditions of speed of the driven shaft G will be substantially as stated.

In Fig. 5 I have shown a modification of the apparatus, omitting detail views for clearness and brevity. In this form of the apparatus, the main differential gearing is interposed between the main driving shaft 2 and the driven shaft 3. The bevel gear H is fast to the driving shaft 2, and the bevel gear J forms a part of or is otherwise secured fast to a sleeve 4 loose on the driven shaft 3. The bridle L carrying the bevel pinions K is fast to the driven shaft 3 as before. The shaft 2 and sleeve 4 are journaled in bearings 5 and 6 in the casing 7 which surrounds the main differential gearing and the pump structure and motor structure of the fluid pressure transmission gearing or controlling device. In this instance I have shown a fluid pressure device substantially like that disclosed in United States Patent No. 924,787, and I have interposed the main gearing between the mid plates 8 and 9, which are stationary and to which the sections of the casing 7 are secured. Each mid plate is provided with two semi-circular ports 8ª and 9ª to the left and right respectively of the longitudinal plane of the device, and the ports 8ª at one side are connected by the pipe or passage 10 while those at the other side are connected by the piping 11, so that the motive fluid passes through the ports at one side of the center and through pipe 10 from the pump to the motor, and returns through the ports at the other side and through connection 11 from the motor to the pump.

Since the pump and motor sections of the device are similar, but one will be described, omitting details of construction which are not essential to an understanding of the principles of operation. The pump cylinder barrel 13 is connected to rotate with the driving shaft 2 while the motor cylinder barrel 14 is connected to rotate the sleeve 4. The pump cylinders 15 are provided with ports 16 adapted to register with the ports in the mid plate 8 and the cylinders 15 are provided with reciprocating pistons 17 suitably connected by piston rods 18 to a socket ring 19 having trunnions 24 pivoted to a universal joint ring 20 pivoted at 21 at each side to the driving shaft 2. The socket ring 19 turns on a track or guide formed by balls 22 which run in a ring or box 23 pivoted to the sides of the casing 7 in such manner (shown in Fig. 7) that the axes of the trunnions 24, pivots 21, and the pivots of the box 23 will intersect at the same point. The ring or box 23 is provided with a toothed segment 25 having operative connections by means of which the ring may be rotated through the agency of a shaft 26 to which a hand wheel 27 may be connected, for varying the angle of the box 23 and connected parts. In this manner, the throw of the pistons 17 is varied and the speed and direction of rotation of the motor barrel 14 is varied, thereby controlling the speed and direction of rotation of the sleeve 4 and gear J of the differential gearing.

In the operation of the apparatus shown in Fig. 5, power is applied to the driving shaft 2 through the gear or pulley F and the ring 19 is rotated, thus actuating the pistons 17 in the cylinder barrel 13 to circulate the motor fluid between the pump and motor through the valve ports and connections 10 and 11. The gear H is rotated with the driving shaft, and the gear J is rotated with the pump barrel 14, in either direction and at varying speeds, or else the gear J is held stationary, according to the adjustment of the box 23 of the pump, and the operation of the differential gearing is thus controlled in the same manner as described in connection with Fig. 1, the principles of operation being the same.

I am not to be understood as limiting the invention to the constructions shown, as different combinations of elements may be devised without departing from the spirit of the invention.

I claim and desire to obtain by Letters Patent the following:

1. In variable speed transmission gearing, the combination of the driving and driven shafts, positively acting variable transmission devices connecting said shafts, and positively acting fluid pressure means operatively connected with the driving shaft for controlling said transmission devices, and thereby positively varying the speed and direction of rotation of the driven shaft by infinitely small amounts between predetermined limits.

2. In variable speed transmission gearing, the combination of the driving and driven shafts, positively acting variable transmission devices connecting said shafts, and positively acting fluid pressure controlling means operatively connected with the driving shaft and connected to one member of the variable transmission devices, for controlling said devices and thereby positively varying the speed and direction of rotation of the driven shaft by infinitely small amounts between predetermined limits.

3. In variable speed transmission gearing, the combination of the driving and driven shafts, positively acting variable transmission devices connecting said shafts and having a movable controlling member, and positively acting fluid pressure controlling means operatively connected with the driving shaft and connected to said movable controlling member for positively varying the speed and direction of rotation of the driven shaft by infinitely small amounts between predetermined limits.

4. In variable speed transmission gearing, the combination of the driving and driven shafts, positively acting variable transmission devices connecting said shafts and having a movable controlling member, and positively acting controlling apparatus for the transmission devices comprising a fluid pressure pump operatively connected with the driving shaft and a fluid pressure motor driven by the pump and connected to the said movable controlling member, for positively varying the speed and direction of rotation of the driven shaft by infinitely small amounts between predetermined limits.

5. In variable speed transmission gearing, the combination of the driving and driven shafts, positively acting differential gearing connecting said shafts having a movable controlling member, and positively acting fluid pressure controlling apparatus comprising a circulating chamber, a pump operatively connected with the driving shaft and a motor connected to the said movable controlling member, whereby the speed and direction of rotation of the driven shaft are positively varied by infinitely small amounts between predetermined limits.

6. In variable speed transmission gearing, the combination of the driving and driven elements, positively acting variable transmission devices connecting said elements and having a movable controlling member, and positively acting controlling apparatus for actuating said movable member and for controlling the speed and direction of rotation of said movable member, comprising a fluid pressure pump operatively connected with the driving element and adapted to be continuously actuated in one direction, and a fluid pressure motor connected to said movable member and capable of being driven in either direction at varying speeds by the continuous operation of the pump in one direction, whereby the speed and direction of rotation of the driven element are positively varied by infinitely small amounts between predetermined limits.

7. In variable speed transmission gearing, the combination of the driving and driven elements, continuously positive variable transmission devices connecting said elements and having a movable controlling member, and continuously positive controlling apparatus for said variable transmission devices, connected to be actuated continuously in one direction by the driving element and capable of actuating the said movable controlling member in different directions at varying speeds, and connections between said controlling apparatus and said movable member, whereby the speed and direction of rotation of the driven element are positively varied by infinitely small amounts between predetermined limits.

In testimony whereof I have signed this specification in the presence of two subscribing witnesses.

ALEXANDER H. COOKE.

Witnesses:
JOHN ELIAS JONES,
LORETTA LUCK.